United States Patent [19]

Sumida et al.

[11] Patent Number: 4,659,215
[45] Date of Patent: Apr. 21, 1987

[54] OPTICAL FIBER TEST METHOD AND APPARATUS

[75] Inventors: Shin Sumida; Hisashi Murata; Yutaka Katsuyama, all of Mito, Japan

[73] Assignee: Nippon Telegraph and Telephone Public Corporation, Tokyo, Japan

[21] Appl. No.: 672,886

[22] Filed: Nov. 19, 1984

[30] Foreign Application Priority Data

Nov. 18, 1983 [JP] Japan ............................ 58-217458
Apr. 18, 1984 [JP] Japan ............................ 59-77848

[51] Int. Cl.⁴ ...................... G01N 21/84; G01N 21/59
[52] U.S. Cl. .................................... 356/73.1; 356/435
[58] Field of Search ............................. 356/73.1, 435

[56] References Cited

U.S. PATENT DOCUMENTS 4,183,666  1/1980  Tahara et al. ...................... 356/73.1

FOREIGN PATENT DOCUMENTS

198015  11/1983  Japan ............................ 356/73.1

Primary Examiner—Vincent P. McGraw
Attorney, Agent, or Firm—Cushman, Darby & Cushman

[57] ABSTRACT

A test optical fiber is slightly bent to a restorable extent, and light is side-illuminated on the bent portion to couple an optical signal to the test fiber. The optical signal coupled to the fiber by this method, propagates through the optical fiber in both directions. If the bending point, which is the point of coupling, is provided near one end of the optical fiber, because the power of the optical signal output from the end is substantially one half of the power of an optical signal coupled at the bending point, the transmission loss of the optical fiber can be measured by comparing the optical power with the optical power of the signal reaching the other end of the fiber.

10 Claims, 17 Drawing Figures

OPTICAL FIBER TEST METHOD AND APPARATUS

BACKGROUND OF THE INVENTION

This invention is used for testing optical fibers in communication systems. This invention further relates to a non-destructive test method for simple and yet accurate measurement of optical loss characteristics of an optical fiber by coupling light by means of an optical fiber at a location other than the ends of the fiber. The invention also includes an apparatus for implementing the method therefor.

There are two representative methods for measuring optical loss characteristics in the prior art. The cutback method calculates optical losses by comparing the power received on the input side of a test optical fiber with the power received at the output fiber end face. The backscatter method obtains optical loss characteristics by measuring backscatter of an optical signal which is excited within the fiber, scattered by Rayleigh scattering and propagated in the direction of the input fiber end.

Figure 1:
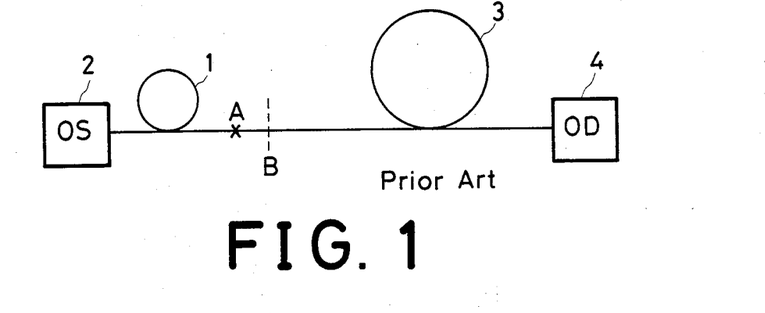
FIG. 1 is a block diagram of the prior art cutback method.

The cutback method comprises, as shown in FIG. 1, the steps of directing an optical signal from an optical source 2 into one of the end faces of an exciting fiber 1. A test optical fiber 3 is connected to the other end of the exciting fiber at point A and the light is coupled thereto. The optical signal at the other end face is detected with an optical detector 4. Then the optical fiber is cut at a point B which is several meters apart from the connection point A of the exciting fiber. The optical signal at the point B is detected. The optical power received at both points is compared in order to calculate optical loss.

In this method, the test optical fiber is cut in order to precisely measure the optical power coupled to the test optical fiber 3 and to exclude from consideration the irregular loss at the connection point A. Although the measurement precision is high, the method involves complicated work in cutting and connecting the exciting optical fiber 1 with the test optical fiber 3. It is further defective in that the cost for tests at manufacturing plants is high because the optical fiber must be cut by several meters or a length equal to the distance from the point A to the point B every time an optical fiber is tested. This leads to higher product prices.

Figure 2:
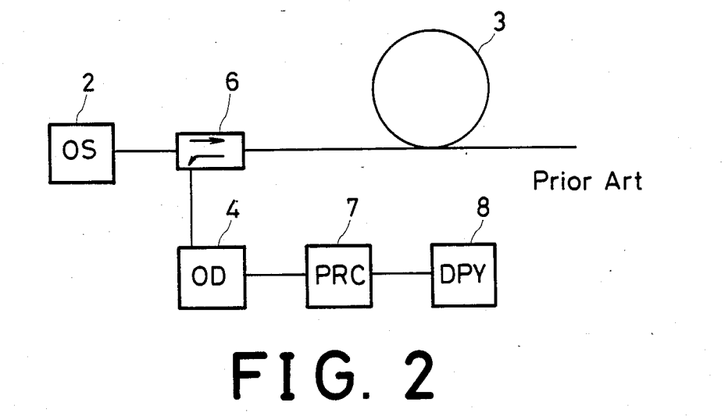
FIG. 2 is a block diagram of the prior art backscatter method.

The backscatter method, as shown in FIG. 2, comprises the steps of directly inputting an optical signal into an end face of a test optical fiber 3 from an optical source 2 using a high output pulse semiconductor laser. The backscattered light, which is light which is generated in the test optical fiber 3 propagated in the direction of the input fiber end, is separated with a directional coupler 6 and measured with an optical detector 4. This method does not involve complex work nor does it destroy test optical fibers. However, it additionally requires a directional coupler 6 and other optical components for separating the input light from the backscattered light. It further involves more sophisticated techniques and requires optical and electric components because, in this method, a weak backscattered light is received by the optical detector 4 using APD. The detected backscattered light is processed with an averager 7 in order to separate noise from signal and displayed by a display 8. This inevitably results in a higher price of the testing procedure.

An object of this invention is to provide a method and apparatus for measuring optical loss characteristics which is simply constructed and very precise and which does not require destruction of test optical fibers.

SHORT STATEMENT OF THE INVENTION

Accordingly, this invention relates to a method for measuring optical loss characteristics of an optical fiber. It comprises the steps of bending a portion of a test optical fiber, inputting light to the bent portion and measuring the light at both ends of the test optical fiber to obtain the optical loss characteristics thereof.

This invention is, in other words, characterized in that the optical loss characteristic of an optical fiber is obtained by forming on a test optical fiber, a slight restorable bend with a small bending radius, side-illuminating light from outside of the bent portion and comparing the optical power radiated from both ends of the test optical fiber.

If it is assumed that the portion to be bent is selected from the area sufficiently close to one end of the test optical fiber, the optical power emitted from the one end is expressed as $P_1$, and the optical power from the other end as $P_2$. The optical loss characteristic L of the test optical fiber can be obtained by the equation below:

$$L = -10 \log_{10} (P_2/P_1) \text{ (dB)}$$

If the bent portion is covered with a light scattering material, it is possible to evenly distribute the optical signals from the bent portion in both directions.

If the bent portion is covered with a light reflecting material together with an optical source, the coupling efficiency of an optical signal element on the optical fiber can be improved.

The invention also relates to an apparatus for measuring optical loss characteristics of an optical fiber comprising a mechanical means to bend a test optical fiber with a small bending radius, an optical source which illuminates the optical fiber on said bent portion, and an optical power detection means connected to both ends of the test optical fiber.

If bending with a small curvature is provided at a point somewhere along the fiber length, the optical signal propagating through the fiber core leaks outside at the bent portion through the cladding because it does not satisfy the conditions of total reflection against the cladding. Because the optical path is reversible, if the bent portion is, conversely, illuminated from outside, the optical fiber can be inputted with an optical signal. The bent portion can be restored to the original state after the measurement.

This invention enables one to input an optical signal in an optical fiber in the form of a fiber or a coated fiber without destroying the fiber and to measure it with a simple apparatus such as an optical source and a power meter, thereby significantly reducing the number of work steps. Currently, the cost for testing accounts for a large portion of the price of optical fibers. However, if the non-destructive test according to this invention can be applied, the cost for testing will be cut down by a large margin, thereby enhancing the economic efficiency in optical communication systems.

If the area near the coupling point which is bent is covered with a light scattering material, the coupled light can be distributed uniformly in both directions. Further, if the bent portion, as well as, the optical element are covered with a light reflecting material, the optical signal can be coupled with a higher efficiency. This arrangement will improve the signal to noise ratio of the coupled optical signal, enhance precision in measurement and expand the dynamic range of the signal when transferring data.

DETAILED DESCRIPTION OF THE PREFERRED EMBODIMENTS

In the drawings the reference numeral 1 denotes an exciting optical fiber, 2 an optical source, 3 a test optical fiber, 4 an optical detector, 6 a directional coupler, 7 an averager, 8 a display, 11 and 12 optical detectors, 13 a lens system, 14 a test optical fiber fixing mount, 15 a spring section for the test optical fiber fixing mount, 23 a container inside of which is made with a light scattering material, 25 a tube, and 26 and 27 reflecting materials.

Figure 3:
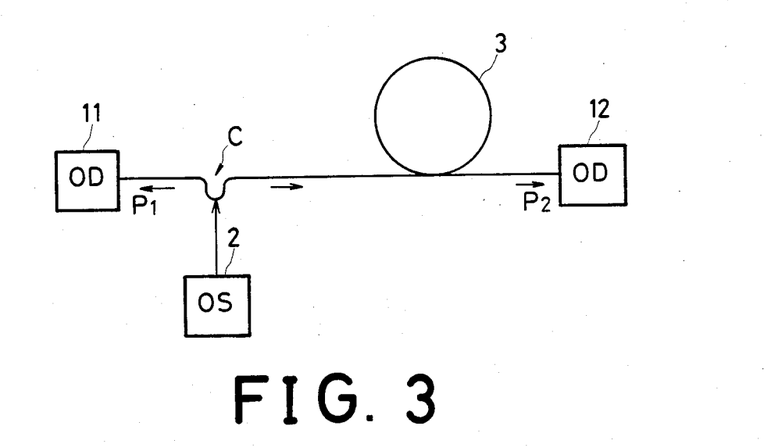
FIG. 3 is a block diagram to show the theoretical structure of an embodiment according to this invention.

Turn now to FIG. 3 which is a block diagram of an embodiment of the apparatus according to this invention. A test optical fiber 3 is slightly bent with a small bending radius at a point C. The bent portion is side-illuminated from outside with an optical signal from an optical source 2. This excites propagating light inside the test fiber 3. The light propagates toward both ends through the test optical fiber 3 and is detected with optical detectors 11 and 12. If the optical fiber length between the input point C and the optical detector 11 is made sufficiently shorter than the length between the point C and the optical detector 12, the optical loss between the point C and the detector 11 can be ignored. If it is assumed that the optical power measured by the detector 11 is expressed as $P_1$ and the optical power measured by the optical detector 12 as $P_2$, the optical loss L can be approximated. Assumming an equal power propagation toward the two fiber ends, fiber losses in the two fiber sections are given by $$Loss_1 = 10 \log (P_0/P_1) \quad (1)$$

$$Loss_2 = 10 \log (P_0/P_2) \quad (2)$$

where $P_1$ and $P_2$ are the output optical powers measured at the fiber ends and $P_0$ is a propagating power at the coupling point. If the fiber length ($L_1$) is short and therefore the loss ($Loss_1$) is negligibly small in the short fiber section, compared to the loss ($Loss_2$) in the long fiber section, then the fiber loss L is easily calculated from (1) and (2) as follows:

$$L = Loss_1 = 10 \log (P_1/P_2) \quad (3)$$

As shown on the equation (3), the fiber loss measured by this invention does not depend on the absolute power of the light source, and precise power control of the light source is not necessary.

Figure 4:
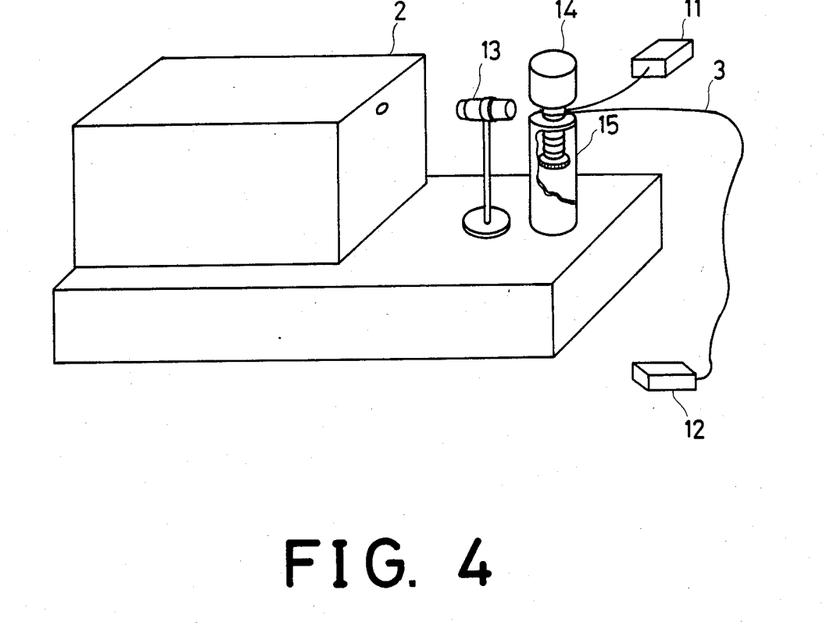
FIG. 4 is a perspective view to show a specific structure of an embodiment according to this invention.

FIG. 4 is a perspective view of a structure of the measurement apparatus according to this invention. An optical source 2, a lens system 13 and a pin 14 are arranged on a stable and solid mount table. The optical source 2 is arranged in a manner so that the output light from the source 2 is slightly defocused by the lens system 13 before illuminating the neck of the pin 14. A test optical fiber 3 is abutted on the neck of the pin 14 in the shape of the letter U to accommadate the shape of the neck. The distance between the pin 14 and the optical detector 11 is 2 m. The pin 14 is provided with a spring structure 15 which keeps the optical fiber 3 abutted onto the neck portion of the pin 14 even if not held with hands. Several types of diameters of the neck are available so that the curvature for the portion can be varied.

The optical source 2 is an He-Ne laser device with an output of 5 mW. In this embodiment, Model No. GLS 2027 manufactured by NEC was used. Optical power meters were used as optical detectors 11, 12.

The lens system 13 has the magnifying power of 20 fold and the distance between the lens 13 and the pin 14 is about 20 mm. The laser beam form the test optical source 2 is expanded to about 4 mm in width to illuminate the bent portion of the test optical fiber 3. The test optical fiber 3 may be, for example, a GI profile fiber having a core diameter of 50 μm, and a cladding outer diameter of 125 μm. The optical fiber 3 also has a cushion layer place upon the cladding comprising silicone resin coated with polyethylene. The outer diameter of the cushion layer is 400 μm. Various samples of the test optical fiber 3 are used.

Figure 5:
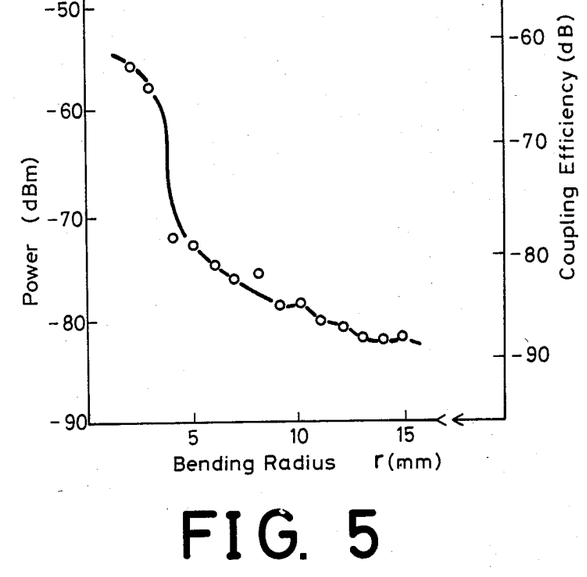
FIG. 5 is a graph to show the relation among the bending radius, power and coupling efficiency of a test optical fiber at the bent portion thereof.

FIG. 5 shows the relation between the curvature of the bending at the input point C and the coupled optical power which is obtained by the test apparatus. More specifically, the graph shows the values measured by a detector 11 of the optical power when the bending curvature of the bending at the input point C on a test optical fiber is changed and an optical signal propagates 2 m within the fiber 3. The coupling efficiency (dB) is plotted on the right axis assuming the output from the optical source 2 is 5 mW.

The graph indicates that the coupling efficiency remarkably increases if the bending radius at the point is 3 mm or less. If it is assumed that the bending radius is 2 mm, the inlet optical power becomes approximately −55 dBm. As the minimum power level of a high sensitivity power meter is −90 dBm, there will be a sufficient dynamic range of 35 dB, proving the test practically valid.

Figure 6:
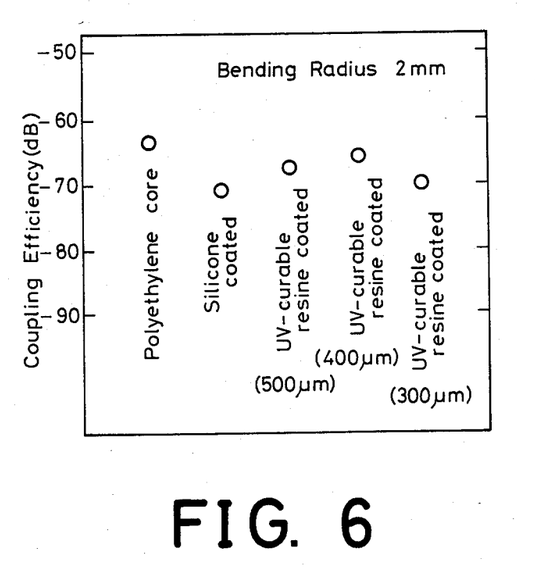
FIG. 6 is a graph to show measured values of coupling efficiency of an optical fiber with different claddings.

FIG. 6 is a graph showing the coupling efficiency obtained in a test on samples with different coatings. Using the same test apparatus, the coupling efficiency was measured. The result shows this invention can be applied not only to UV-curable resin coating and silicone coated fiber but also to polyethylene coated fibers. The bending radius was 2 mm for both tests.

A sample of a test optical fiber was bent to have the curvature radius of 2 mm, and the fiber was straightened to recover the original shape. There was no damage or traces of bending left in the fiber. An optical signal was passed through the restored portion to ascertain that no change was caused.

Figure 7:
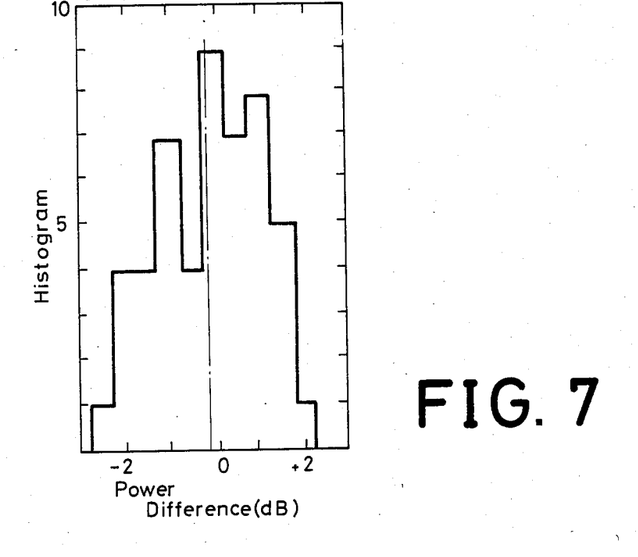
FIG. 7 is a histogram of the optical power difference (dB) between both end faces of an optical fiber which is apart by 2 m from a launching point.

FIG. 7 shows that result of a test which was conducted to ascertain that optical signals of almost similar power were propagated from the input point C through a test optical fiber in both directions on the system shown in FIG. 3. The distances from the input point C to the detectors 11 and 12 were 2 m, and the difference in the optical powers detected by both detectors were measured. For the test, 50 optical fibers of silicone fiber coated with polyethylene were prepared. Each of the fibers was mounted once on the tested apparatus for bending, and the frequency distribution was examined. The result of the test is shown in FIG. 7. The graph indicates that the difference in power of the optical signals propagating in opposite directions averages at −0.1 dB although there is deviation of about ±2 dB. If this measurement is repeated a number of times sufficient to obtain an average, it can be reasonably assumed that similar propagating powers are excited in the directions toward both ends of a test optical fiber.

Figure 8:
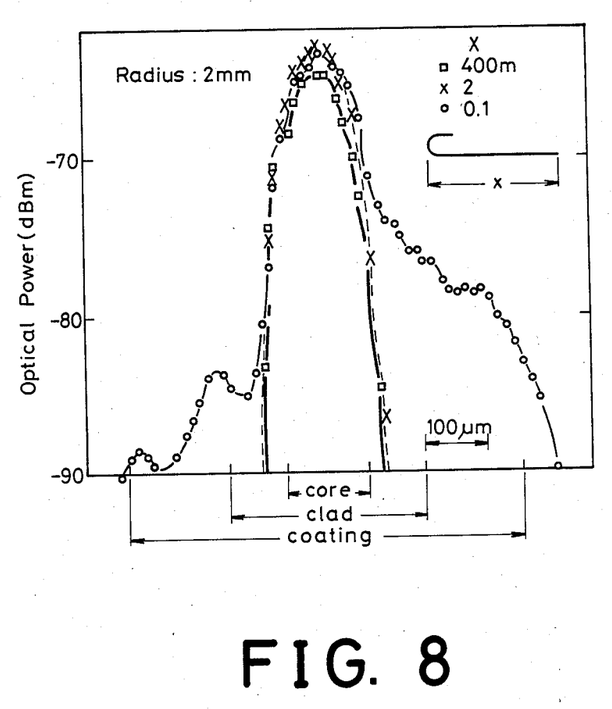
FIG. 8 is a graph to show optical power distribution at end faces of an optical fiber which is separated by various distances from an input point of the test optical fiber.

The error will be about 0.1 dB even if the output light $P_1$ of the shorter section of a test optical fiber is used as an input light for the longer section of the fiber. A question might be raised when an optical signal is provided in a test optical fiber at a bent portion thereof, of whether or not the signal propagates through cladding or coating of the fiber instead of the core. Another test was conducted in order to prove the point. Using the same testing apparatus as above, and setting the distance from the input point C to the optical detector 12 at 400 m, 2 m and 0.1 m, distribution of optical power was measured at the end faces of the fibers. FIG. 8 shows the result. The bending radius at the input point of the fiber was 2 mm. At the fiber length of 0.1 m, optical power existed within the coating material. At the fiber lengths of 2 m and 400 m, substantially the same optical power distributions were obtained, suggesting optical power was distributed within the core. If a input point is provided at a position 2 m from the end face of a test optical fiber, an optical signal which propagates in directions toward both ends from the input point can be measured for the loss on the assumption that the power is equally distributed.

Figure 9:
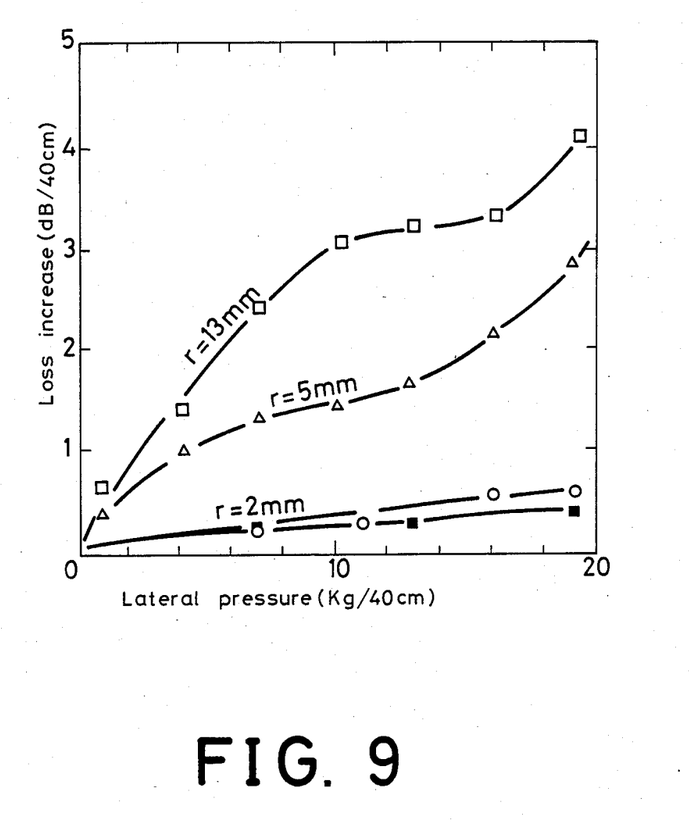
FIG. 9 is a graph to show the relation between side pressure and loss increase when the bending radius of a bent portion of the test optical fiber is varied.

The next problem to be solved for the method according to this invention will be to clarify the power exciting states of a multi-mode fiber by each mode through lateral input. It is known that the measured values for loss of a multi-mode fiber vary depending on input methods. In order to have a stationary mode condition, the light which has been propagated through a sufficiently long dummy fiber is usually provided in a test optical fiber. Applying lateral pressure, the loss increase was measured in order to examine the power distribution in the excitation method of this invention. FIG. 9 shows the relation between the lateral force and the loss increase when the bending radius of a test optical fiber is changed at the launching point wherein the mark □ indicates the case with the bending radius of 13 mm, Δ of 5 mm, 0 of 2 mm and — the conventional case where excitation is carried with a dummy fiber. In the cases where the bending radii were relatively large, i.e., at 13 mm and 5 mm at the input point, the loss increase was remarkable as the lateral force increased. This may be attributable to the fact that optical power was excited not only in lower modes but also in higher modes where the loss increase became large due to the lateral pressure. In other words, the excitation state was not a stationary mode distribution. When the bending radius was 2 mm, on the other hand, the result was substantially similar to that when excitation was carried through a dummy fiber. This may be because the light excited in higher mode was radiated simultaneously.

This proves the fact that if a bending radius is set close to 2 mm on this fiber, not only does it enhance the coupling efficiency but also enables one to assess the loss in a mode similar to the stationary mode realized with the dummy excitation method. Although the dummy excitation is the most popular method for loss evaluation, the method of this invention can be applicable to various cases simply by changing the bending radius. The method of this invention will be most convenient for the case where an optical fiber is directly excited with a laser diode.

Figure 10:
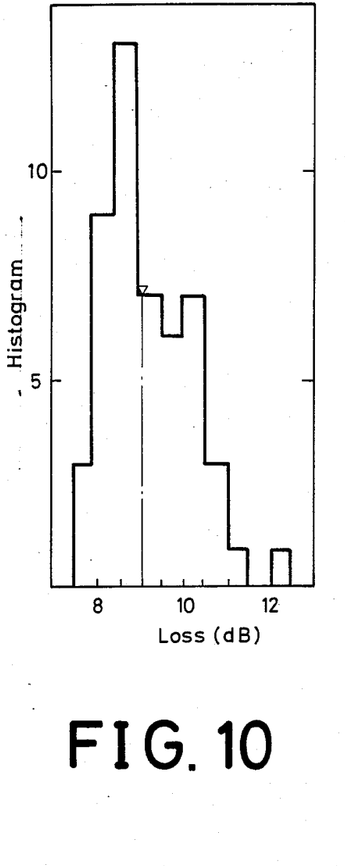
FIG. 10 is a histogram to show the result of loss characteristics of an optical fiber measured according to the method of this invention.
Figure 11:
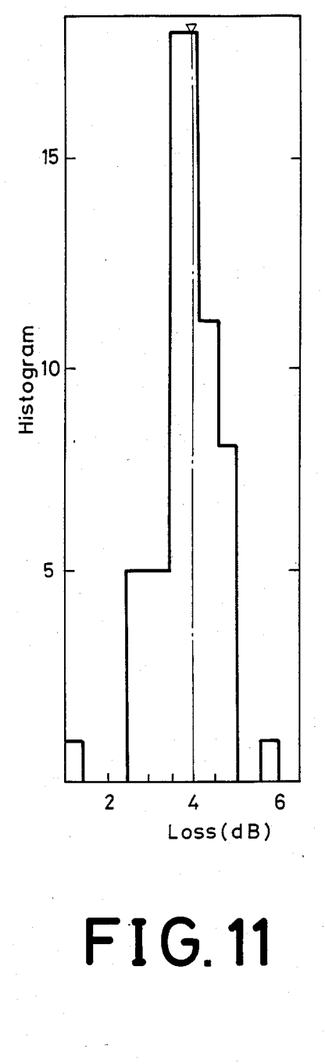
FIG. 11 is a histogram to show the result of loss characteristics of an optical fiber measured according to the method of this invention.

The loss measured under the above conditions by the method of this invention is shown below. FIGS. 10 and 11 are graphs showing the loss in an optical fiber measured by this method. The length of the optical fiber on the shorter section was 2 m for both cases and the bending radius at the input point was 2 mm. The measurement was taken 50 times. FIG. 10 is a histogram of the loss values of a silicone coated fiber (1.5 km long) measured by this method. FIG. 11 is a histogram showing the loss values of a polyethylene coated fiber (0.45 km long) measured by this method. In the case shown in FIG. 10, the mean loss was 9.2 dB when measured by this method. For comparison, the same sample was measured by the prior art cutback method to obtain the loss value of 9.1 dB. In the case shown in FIG. 11, the loss values according to this method averaged 3.9 dB while the loss values measured by the cutback method averaged 3.8 dB.

The result of the loss measurement according to this invention shows an excellent coincidence with the one obtained by the conventional cutback method.

Figure 12:
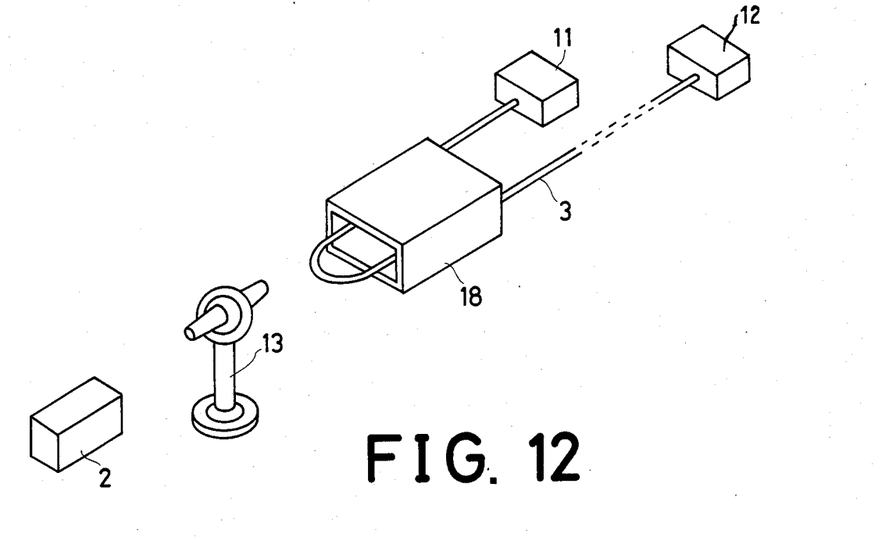
FIG. 12 is a perspective view to show the structure of the main parts of an embodiment of the apparatus according to this invention.

FIG. 12 is a perspective view to show another embodiment having a different structure for bending. Measurement was carried out simply and reliably by this structure.

Figure 13:
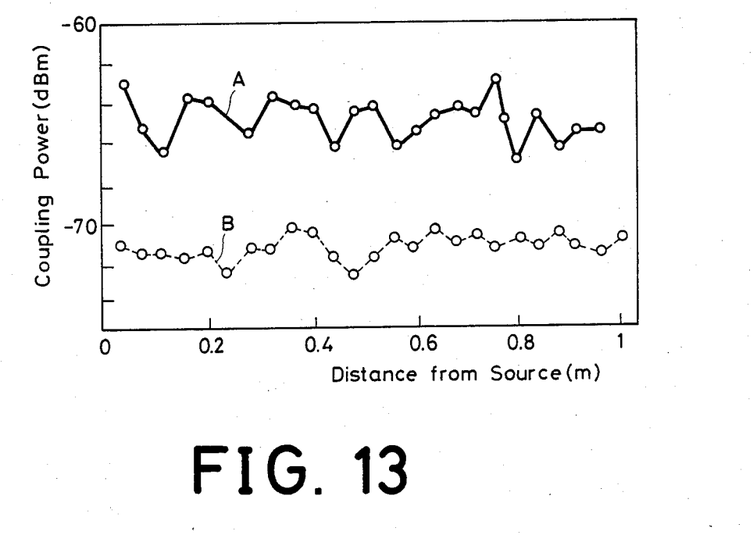
FIG. 13 is graph which shows the result of measurement of coupling characteristics with different intensities of a light beam for illumination.

Another test was conducted using this structure for focusing the light which illuminates a test optical fiber 3. An optical signal which illuminates the test optical fiber 3 was slightly defocused by the lens system 13. Although the optical power coupled in the test fiber 3 became smaller, the optical power assumes stable values without much deviation. The structure shown in FIG. 12 was used to provide bending on a fiber at a position 450 m away from an optical detector 12. Optical power was measured with the detector 12 by moving the bending position by 4 cm once every 1 m for a total of 25 times. The result is shown in FIG. 13. FIG. 13A shows the result of measurement where the light outputted from a laser device was directly illuminated on a test optical fiber 3 without using the lens system 13. FIG. 13B shows the result of measurement using the lens system 13 wherein the distance from the lens system 13 to the bent portion was set at about 20 mm, and the laser beam was expanded to about 4 mm for illumination. The average value was 64.9 dB and the standard deviation was 1.04 dB in FIG. 13A. The average value was 71.1 dB and the standard deviation was 0.57 dB in FIG. 13 B. The above indicates that if the output light beams from a light source are defocused, the deviation becomes small and the coupling power also becomes small.

Figure 14:
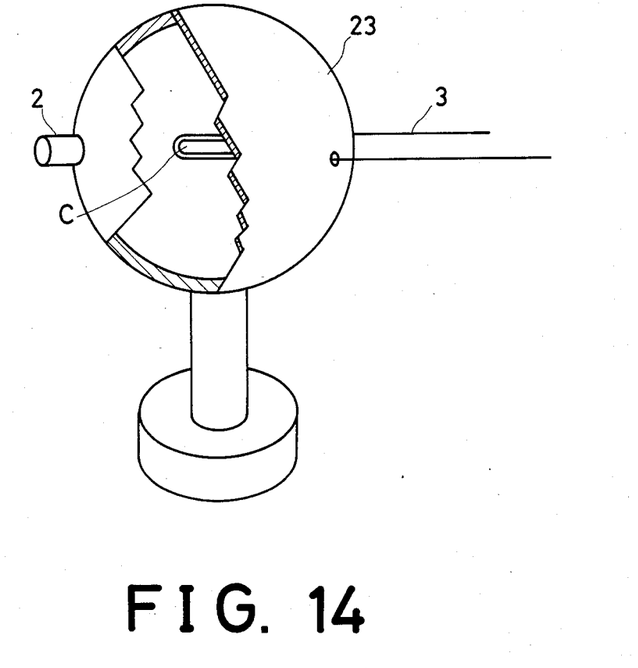
FIG. 14 is a perspective view which shows the structure of the main parts of an optical coupling section of an embodiment according to this invention.

Structures where the optical coupling section is covered by a light scattering material will now be described. FIG. 14 shows the critical portion for the coupling of an embodiment of this invention wherein a bend was formed at the portion C of a test optical fiber and the portion was placed in a container 23. An optical source 2 was attached inside the container 23. The unique feature of this structure lies inside the container 23. The inside of the container 23 comprises the light scattering material; for example, white paint. It may not be white but may be any paint as long as the paint does not absorb the spectrum of the wavelength of the optical signal but absorbs spectrums of other wavelengths. It may be a mirror, the surface of which is finished opaque.

If the apparatus is structured as above, the optical signal does not leak out of the container 23, but repeats diffused reflections within the container 23 and thus is contained therein. This enables uniform illumination of the bent portion C to thereby couple the optical signal in the fiber 3 equally in both directions at an excellent coupling efficiency.

Figure 15:
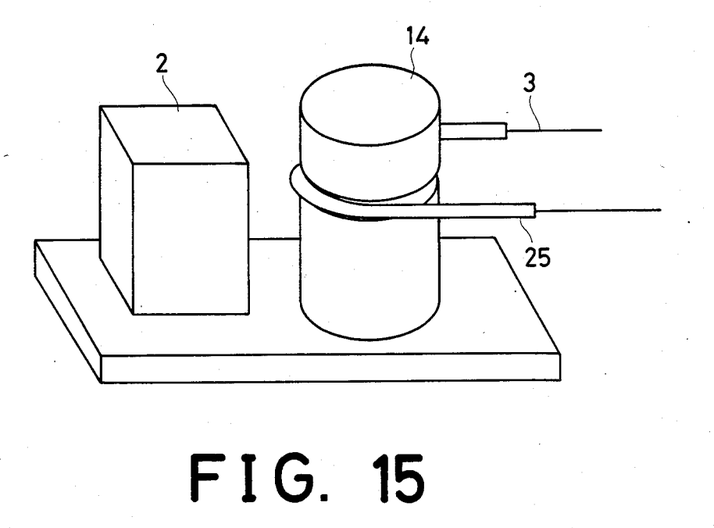
FIG. 15 is a perspective view which shows a structure of the main parts of an optical coupling section of an embodiment according to this invention.

FIG. 15 is perspective view of another embodiment of the bent portion according to this invention. In this embodiment, the optical fiber 3 is bent along a pin 14 and an optical signal is illuminated on the portion from a source 2. The optical fiber 3 is covered with a tube 25 made of a light scattering material. An example of a transparent tube is one in which the surface is processed opaque. Another example is a transparent tube containing a large number of fine particles which scatter light.

In this structure the light illuminated onto the tube 25 is scattered thereon to reach the optical fiber 3. Therefore, the optical fiber 3 is uniformly illuminated on the portion covered with the tube 25. The light can be coupled to the fiber 3 at a high efficiency.

Figure 16:
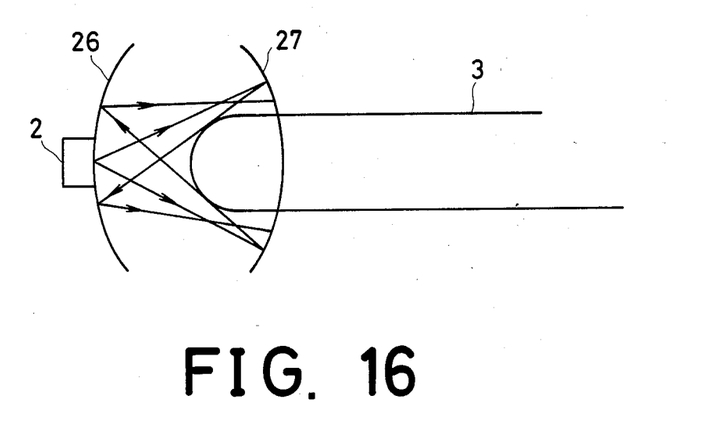
FIG. 16 is a view which shows a main structure of the optical coupling section of another embodiment of this invention.

FIG. 16 shows another embodiment of the bending portion of the invention. The portion of the fiber 3 is covered with two reflecting members 26, 27 so that the optical signal starting from the source 2 is repeatedly reflected, as shown by the arrow in the figure, to illuminate the fiber 3. This structure enables the optical signal to be illuminated evenly along a certain length of the fiber without becoming concentrated on a particular portion, and the optical signal coupled on the fiber 3 becomes uniform in both directions. The coupled optical power is increased because it is repeatedly illuminated.

Figure 17:
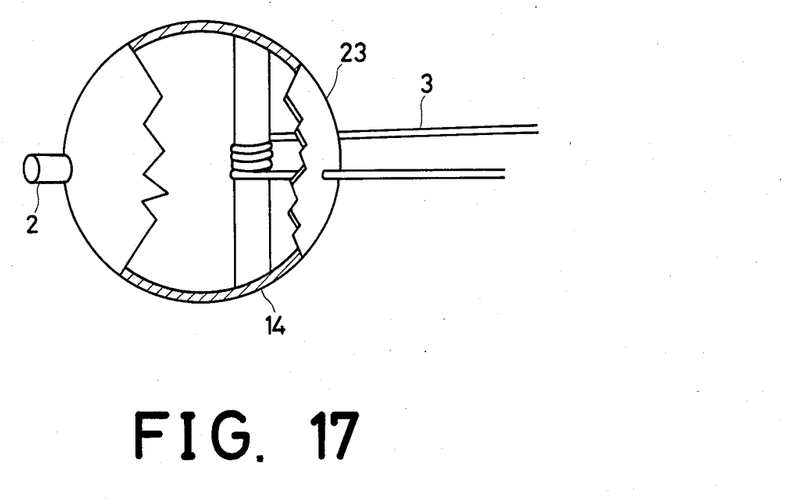
FIG. 17 is a view which shows a structure of the optical coupling section of another embodiment of this invention.

FIG. 17 shows another embodiment of the bending portion of the invention. A test optical fiber 3 is wound around a pin 14 several times in this embodiment. The structure is otherwise the same as the one shown in FIG. 14. In this structure, the effective length of the bent portion is large, and the coupling efficiency is high.

There are various mechanical structures for providing bending to a fiber besides those shown above. Although the above described structures are intended for use in laboratory, this invention can be worked by using mechanical structures suitable for manufacturing plants or cable construction sites.

What is claimed is:

1. A method for measuring the optical loss characteristics of an optical fiber comprising the steps of:
    bending a test optical fiber at a portion along its length with a small bending radius;
    side-illuminating said fiber with light from outside of the bent portion; and
    comparing optical powers radiated from both ends of said test optical fiber to obtain the optical loss thereof.

2. The method for measuring the optical loss characteristics of an optical fiber as claimed in Claim 1 wherein if the portion to be bent is sufficiently close to one end of the test optical fiber, the optical power radiated from said end is $P_1$, and the optical power radiated from the other end of the optical fiber is $P_2$, measuring the optical loss characteristic L of the test optical fiber by calculating the equation $$L = -10 \log_{10} (P_1/P_2) \text{ (dB)}$$

3. The method for measuring the optical loss characteristics of an optical fiber as claimed in claim 1 wherein the bending radius of the bent portion is 3 mm or less.

4. The method for measuring the optical loss characteristics of an optical fiber as claimed in claim 1 wherein the bent portion is covered by a light scattering material.

5. The method for measuring the optical loss characteristics of an optical fiber as claimed in claim 4 wherein an optical source is provided inside the light scattering material.

6. The method for measuring the optical loss characteristics of an optical fiber as claimed in claim 4 wherein the optical source is provided outside the light scattering material.

7. The method for measuring the optical loss characteristics of an optical fiber as claimed in claim 1 wherein the bent portion and the optical source are covered with a light reflecting material.

8. An apparatus for measuring the optical loss characteristics of an optical fiber comprising;
    a mechanical means for bending a test optical fiber with a small bending radius;
    an optical source which illuminates said optical fiber on said bent portion, and an optical power detection means which is connected to both ends of said test optical fiber, respectively.

9. The apparatus for measuring the optical loss characteristics of an optical fiber as claimed in claim 8 wherein the bent portion is covered with a light scattering material.

10. The apparatus for measuring the optical loss characteristics of an optical fiber as claimed in claim 8 wherein the bent portion and the optical source are covered with light reflecting material.

* * * * *